United States Patent

Chow et al.

[15] 3,680,034
[45] July 25, 1972

[54] CONNECTOR - UNIVERSAL

[72] Inventors: Weichien Chow, Park Forest; Jerry Provinsky, Downers Grove, both of Ill.

[73] Assignee: The Bunker-Ramo Corporation, Oak Brook, Ill.

[22] Filed: July 17, 1969

[21] Appl. No.: 842,450

[52] U.S. Cl. .................................................339/48, 339/49
[51] Int. Cl. .....................................................H01r 25/00
[58] Field of Search ................285/32, 65, 66; 287/103, 104; 339/47, 48, 49, 89

[56] References Cited

UNITED STATES PATENTS

| | | | |
|---|---|---|---|
| 2,829,358 | 1/1958 | Testori | 339/89 M X |
| 2,882,509 | 4/1959 | Archer et al. | 339/48 |
| 3,245,028 | 4/1966 | Badger | 339/48 X |
| 3,398,388 | 8/1968 | Chow | 339/49 B |

*Primary Examiner*—James A. Leppink
*Assistant Examiner*—Terrell P. Lewis
*Attorney*—Frederick M. Arbuckle

[57] ABSTRACT

A universal connector assembly for a co-axial cable, or air line, including a pair of identical units, each mounted one one of the line sections to be connected, one of them having an inner sleeve fitted over the ends of both line sections at the juncture when the units are connected, and an outer coupling ring connectable to a fixed element in the other unit; also center contact means for connecting the center conductor, including a button on each, and each button including radially flexible fingers penetrable into its own center conductor and self-biased into engagement with the other button.

20 Claims, 13 Drawing Figures

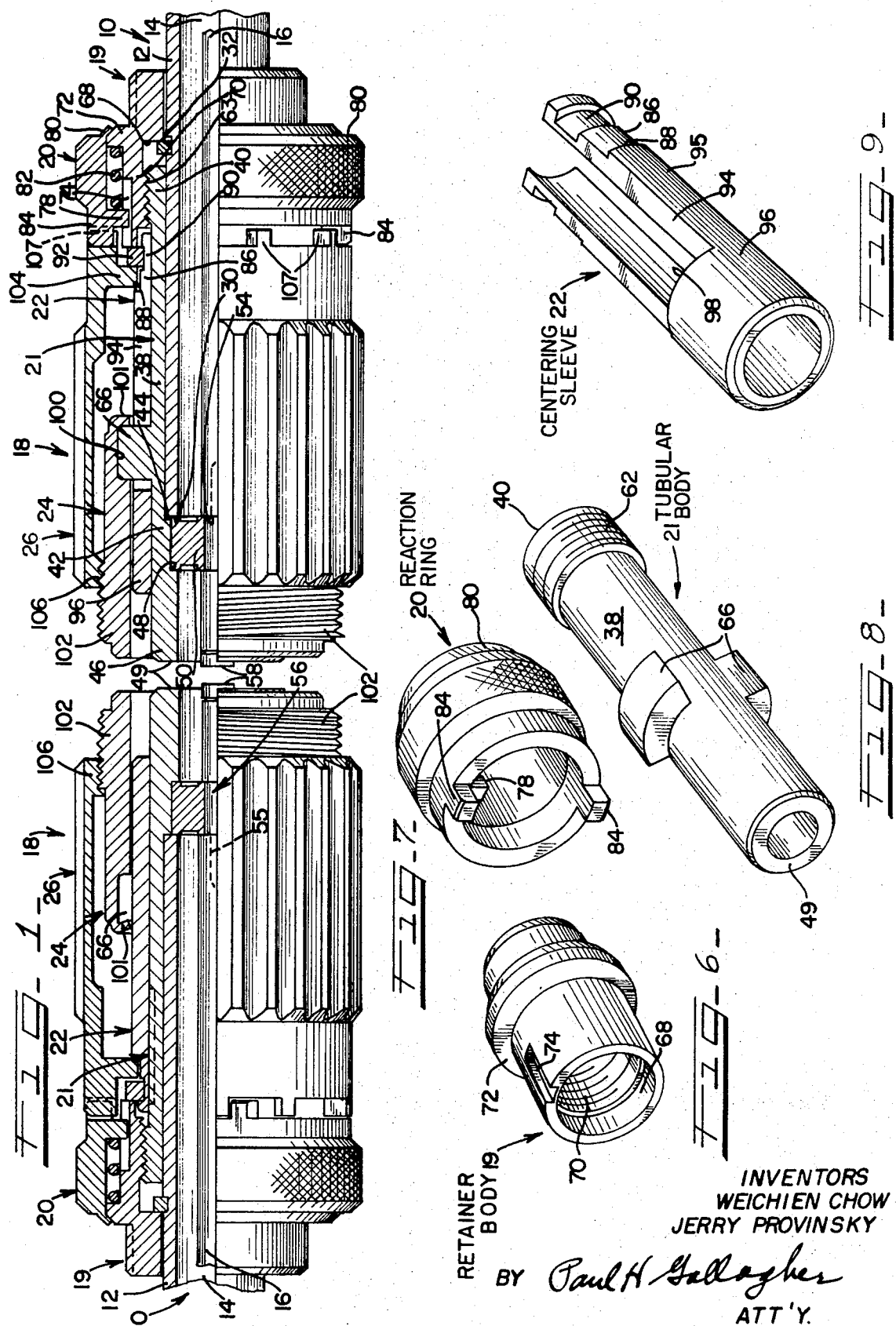

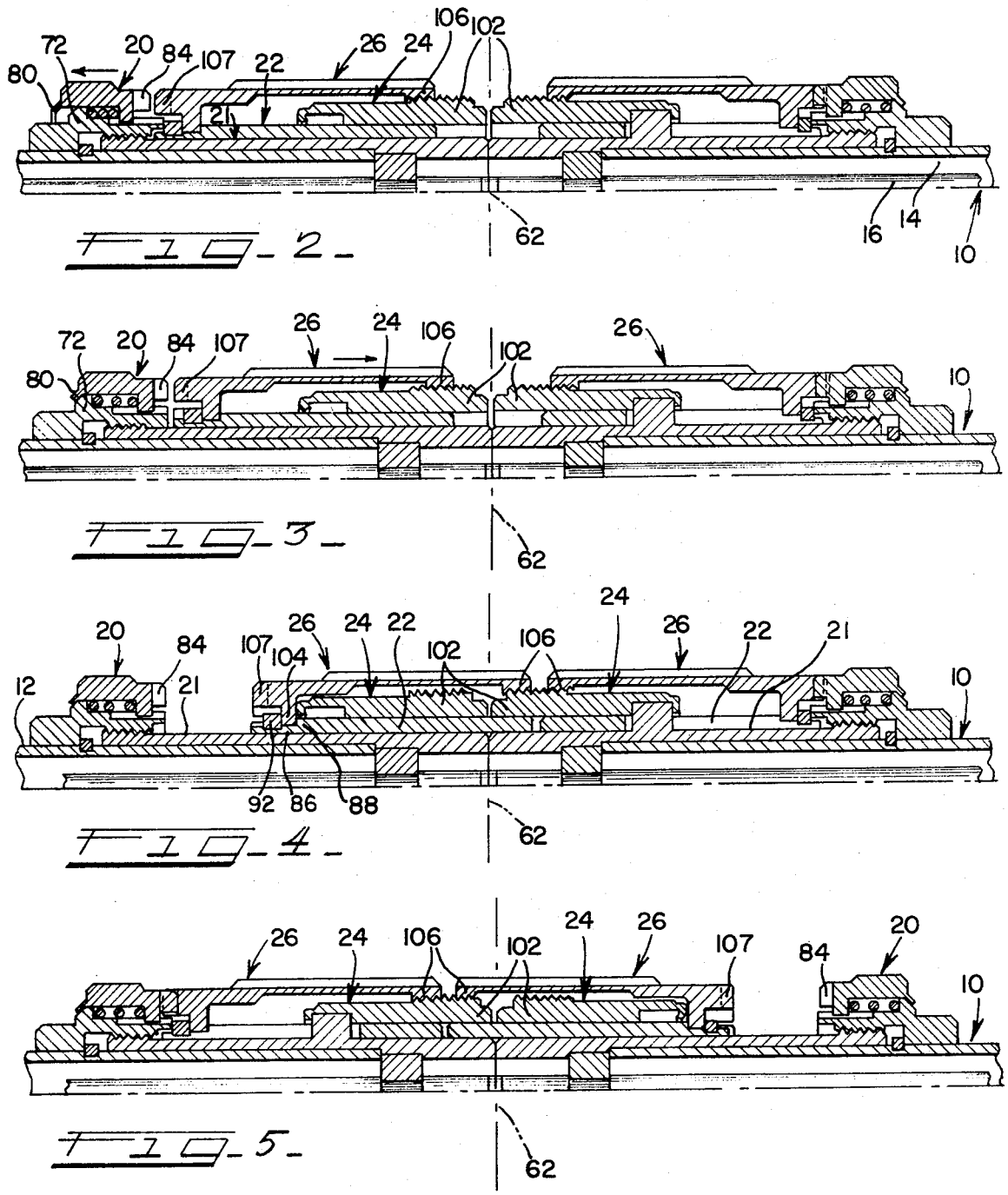

PATENTED JUL 25 1972
3,680,034
SHEET 3 OF 3
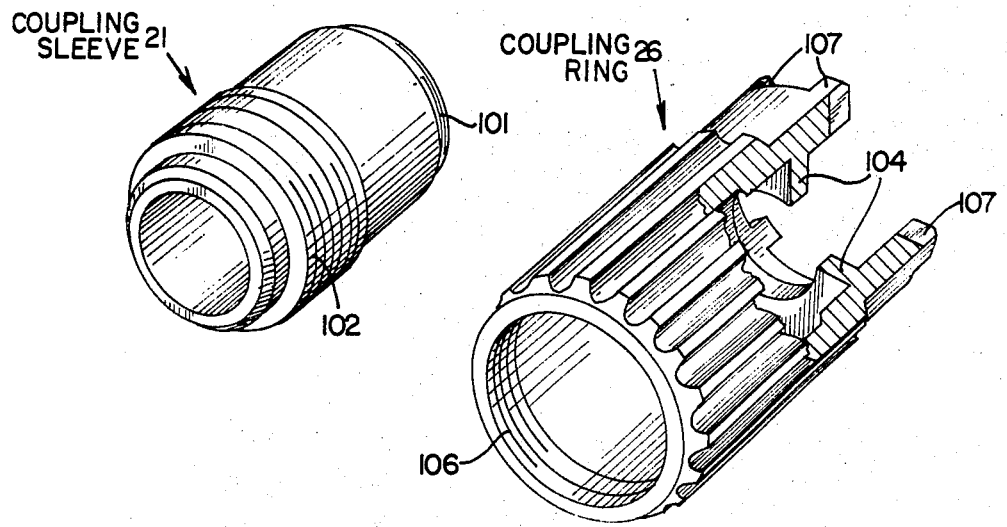
FIG. 10.
FIG. 11.
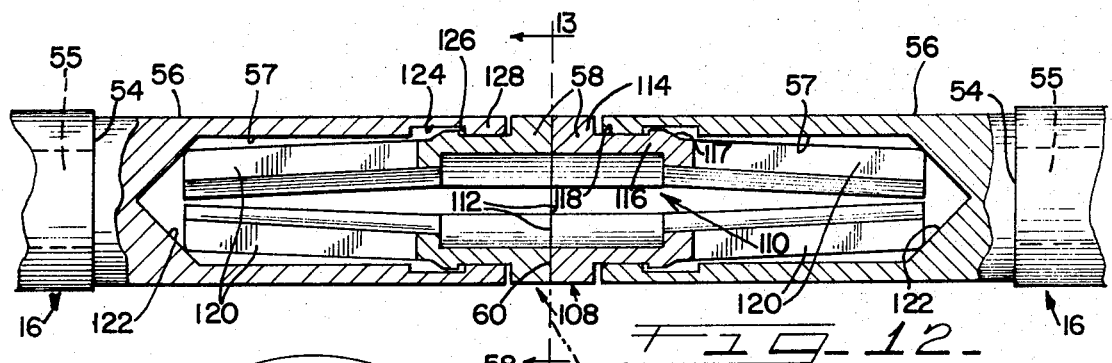
FIG. 12.
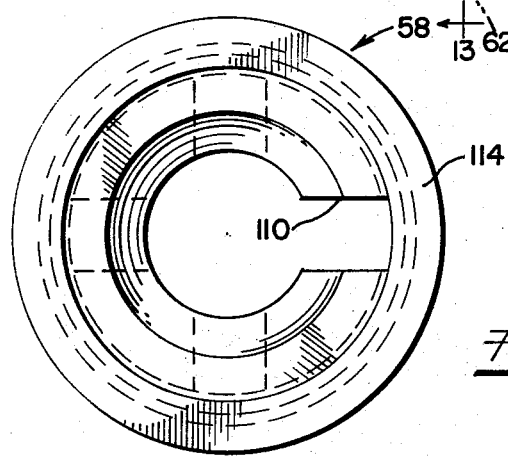
FIG. 13.
INVENTORS
WEICHIEN CHOW
JERRY PROVINSKY
BY Paul H. Gallagher
ATT'Y.

3,680,034

CONNECTOR - UNIVERSAL

OBJECTS OF THE INVENTION

A broad object of the invention is to provide a novel construction of universal connector means for connecting line sections, which includes a unit on each of the sections, the units being identical and each being connectable with the other, selectively, in identical manner.

Another object is to provide a connector construction of the foregoing general character in the use of which it is not necessary to pre-position the line sections in any special manner, or to place them in any special relative position, such as angular positioning, or telescoping positioning, but only to place them together in end-to-end relation which may be done by moving the sections into that relation in any direction or from any position, including direct sidewise movement, for connecting them together.

Still another object is to provide a connector assembly of the foregoing character, in which when the units thereof are in connected position, there is a sleeve member of one of the connector units disposed over the juncture of the line sections, whereby to improve physical construction by improving the strength thereof, and prevent leakage of radio-frequency signals.

Another object is to provide in a connector of the foregoing general character, identical connector units having outer rotatable members for performing the direct connecting operation, and in which means is provided for normally preventing rotation of those members, but in which that means is selectively releaseable to enable rotation of one of those members while restraining the other, for facilitating the coupling operation.

A still further object is to provide a connector assembly, and connector construction, of the foregoing general character which is extremely simple and of rugged construction, and in the use of which it is only necessary to pre-position the sections in only one kind of movement, in which the sections are placed in end-to-end position, and then to work up a member on only one of the connector units into connecting relation with the other unit.

A further object is to provide a connector assembly of the foregoing general character for use in a co-axial cable, which includes novel means for interconnecting the center conductors of the two sections of the cable to be connected.

DESCRIPTION OF A PREFERRED EMBODIMENT OF THE INVENTION:

In the drawings:

FIG. 1 is a view of a pair of connector units making up the connector assembly of the invention, partially in axial sectional view, mounted on respective sections of a line to be connected, but in spaced apart and unconnected condition;

FIG. 2 is a half-view, in axial section, with the adjacent portions of the respective units in butted relation, and the reaction ring in a selected one of the units in withdrawn position;

FIG. 3 is a view similar to FIG. 2 but showing the coupling ring in the selected unit in partially advanced position and the reaction ring released;

FIG. 4 is a view similar to FIG. 3 but with the coupling ring fully advanced and connected to the corresponding element of the opposite connector unit;

FIG. 5 is a view similar to FIG. 4 but with the connector units in oppositely oriented connected position;

FIG. 6 is a perspective view of the retainer body of a connector unit;

FIG. 7 is a perspective view, partially in section, of the reaction body;

FIG. 8 is a perspective view of the tubular body;

FIG. 9 is a perspective view of the centering sleeve;

FIG. 10 is a perspective view of the coupling sleeve;

FIG. 11 is a perspective view partially in section, of the coupling ring;

FIG. 12 is a half-view, in section, of the means for interconnecting the center conductors; and FIG. 13 is a view taken at line 13—13 of FIG. 12.

Referring now in detail to the accompanying drawings, the line having sections to be connected, and the connector units mounted thereon, are duplicated and identical, and are given common reference numerals but in referring to the individual ones thereof they may be identified as "right" and "left" respectively, by the letters R and L.

The line to be connected is indicated at 10, and the sections at 12. This line may be an electrical line such as a co-axial cable, or air line. In the present instance the co-axial cable line of known character includes an outer conductor 14 and a center conductor 16.

For convenience, forward and rearward refer to axial directions, toward and from the end of the line section, respectively, and outer and inner refer to radial directions, relative to the axis.

The connector assembly is made up of a pair of connector units 18, (see FIG. 1 and other figures as indicated), each including a retainer body 19 (FIG. 6), a reaction ring 20 (FIG. 7), a tubular body 21 (FIG. 8), a centering sleeve 22 (FIG. 9) thereon, a coupling sleeve 24 (FIG. 10) on the centering sleeve, and an outer coupling ring 26 (FIG. 11).

The line section 12 at its forward end which is to be connected with a counterpart line section, has an end surface 30 and a circumferential groove 32 spaced rearwardly therefrom.

The tubular body 21 has a main portion 38 fitted over the line section, a rear externally threaded segment 40, a forward portion 42 of lesser internal diameter than the portion 38 forming a rearwardly directed shoulder 44 engaging the end surface 30 of the line section, and a further reduced diameter portion 46 having a rearwardly facing shoulder 48, and a forward end surface 49.

An annular insulator 50 of suitable and known kind, preferably rigid, is interposed between the shoulder 48 and the end surface 30 of the line section 12. The tubular body 21 in the functioning of the connector assembly is unitary with the line section and forms an effectively integral extension thereof. The line sections 12 in themselves originally are of indeterminate length, but are cut to the desired lengths according to the particular installation.

The center conductor 16 has a forward end surface 54 butted by the insulator 50, and a bore 55 (FIG. 12) into which is inserted a carrier 56 having a bore 57 receiving a center contact or button 58 of a character described below, these center contacts butting at 60, in a common transverse cylindrical surface 62 at which the line sections, and unit themselves, meet or butt.

Reference is again made to the overall construction of the units 18. The tubular body 21 (FIG. 8) at its rearward end has exterior threads 63 on the segment 40 and radially projecting segments 66 (two in number), intermediate its ends. The retainer body 19 (FIG. 6) surrounds the line section 12, having a counter bore 68 in which are internal threads 70 threaded on the threads 62. The retainer body also includes an outer circumferential rib 72 and an axial slot or keyway 74 forwardly thereof.

Surrounding the retainer body 19 is the reaction ring 20 (FIG. 7) which has a radially inwardly directed key 78 extending into the keyway 74, and a lip 80 rolled over the rib 72. A coil spring 82 is compressed between the key 78 and rib 72. The reaction ring 20 is provided with forwardly extending teeth 84, preferably two in number spaced 180° apart.

The centering sleeve 22 (FIG. 9) is telescoped on the tubular body 21 and its rearward end has a reduced portion 86 forming a shoulder 88, rearwardly beyond which is a circumferential groove 90 for receiving a split retainer ring 92. This centering sleeve is provided with diametrically opposed slots 94 receiving the projections 66, these slots being formed between prongs 95. At the forward end this centering sleeve is provided with a circumferentially continuous segment 96 forming rearwardly facing shoulders 98.

The coupling sleeve 24 (FIG. 11) is telescoped over the centering sleeve 22 and has a counterbore 100 receiving the segments 66 of the tubular body 21 and is rolled at 101 over the segments, securing the members 24 and 22 together. Preferably the rolled rib 101 is projected between the segments 66 in anti-rotating relation (see 101L, FIG. 1). This coupling sleeve also is provided with external threads 102 at its forward end.

The coupling ring 26 (FIG. 11) has at its rearward end an inwardly extending flange 104 received between the shoulder 88 and the retainer ring 92, and at its forward end, internal threads 106 threadable onto the threads 102, as referred to again hereinbelow. It also has rearwardly axially extending teeth 107, preferably eight in number, meshing with the teeth 84.

Referring again to the center contacts 58 (FIGS. 12 and 13), each includes a body 108 having a longitudinal split 110 (FIG. 13) for enabling contraction thereof. The body has a forward end contacting surface 112 lying in the transverse plane 62, a surrounding flange 114, which with a rearwardly spaced surrounding flange or rib 116 forms a circumferential groove 118. The contact or button 58 includes a rearwardly inclined camming surface 117 and rearwardly and axially extending spring fingers 120, such as four in number.

The bore 57 in the carrier at its rearward end has a conical surface 122, which may be of 45° inclination, and at its forward end an internal circumferential groove 124 defining a rearwardly facing shoulder 126, forwardly of which is an inwardly directed circumferential rib 128.

The contact or button 58 is inserted into the bore 57 in the carrier by projecting the spring fingers 120 into the bore, these fingers having an outer envelope surface preferably less than, or at least no greater than, the inner surface of the rib 128; after the fingers themselves have been projected into the bore, the inclined surface 117 engages the forward end surface of the rib 128, and in response to continued rearwardly directed pressure, cams the fingers inwardly, the slot 110 (FIG. 13) enabling this contraction, and thus enabling the rib 116 to pass by the rib 128. Upon further movement a sufficient extent, the rib 116 moves into the groove 124 and the inner ends of the fingers 120 engage the conical surface 122. The groove 118 is of axial dimensions greater than the rib 128, enabling limited axial movement of the contact 58 as defined by the end edges of the groove engaging the corresponding end surfaces of the rib 128. In this movement and preferably throughout the full range of that movement, the inner ends of fingers 120 engage the inclined surface 122 for the purpose of normally biasing the contact 58 axially forwardly, as referred to again hereinbelow, in the connecting operation.

In the overall utilization of the device of the invention, the units 18 are applied to the line sections 12 which are to be connected together, the line sections being so dimensioned and applied to the instrumentalities to which they are related in such a manner that the units 18 have their outer opposed end faces (FIG. 2) in juxtaposition if not actually abutting. The normal position of the outer coupling rings 26 is as represented in FIG. 1, and in that position, the teeth 107 thereon are intermeshed with the corresponding teeth 84 on the reaction ring 20. In such position of the coupling ring, it is prevented from rotating because of the intermeshing of those teeth, the reaction ring 20 being held against rotation by the key-keyway 78-74, the retainer body 19 being held by friction in its threaded connection with the tubular body 21, through the retainer ring 92 and end surface 30.

To couple the two units together, one of them is arbitrarily selected, such as the left-hand one (FIG. 1) and the reaction ring 20L thereof is manually retracted as represented in FIG. 2, enabling the corresponding coupling ring 26L to be moved forwardly as represented in FIG. 3; this is done by spinning it or turning it to lead it up on the thread 102L, at least to the extent of removing it from its intermeshing relation from the teeth 84 of the reaction ring, and if desired, to a position extending beyond the teeth 102L, and even projecting beyond the end face of the coupling sleeve. Then after releasing the reaction ring 20L, and upon grasping the two coupling rings 26, the left one, 26L, is manually turned forward beyond the screw threads 102L on its own line segment and onto the threads 102R until it is drawn up tight thereon. In doing so, the inwardly directed flange 104L engages the shoulder 88L on the centering sleeve 22L, the latter acting through the ring 92L and retainer body 19L, the latter in turn acting through the retainer ring 92L, pulling up the corresponding section 12L of the line. When the outer coupling ring 26L is drawn up, its own flange 104L engages the corresponding coupling sleeve 24L, and the two coupling sleeves (L and R), draw up the sections of the line as just described. In a coupling operation there is a natural tendency for a person to turn the outer coupling rings 26 in opposite directions; if not deliberately, at least each would be a reaction against the intended turning of the other, but in the use of the present device, the one coupling ring (26R) is held against turning as described, and serves as a reaction means.

The internal flange 104L, engaging the shoulder 88L, moves the centering sleeve 22L in the manner stated to move it up into its intended position, as represented in FIG. 4. This centering sleeve provides added mechanical strength in providing a single tubular element encompassing both tubular bodies 21L, 21R. Additionally the centering sleeve prevents, or greatly minimizes, unwanted leakage of radiofrequency signals. Upon thus connecting the units, they provide a continuous and effectively integral, and strong line. When the units are in connected condition, the end surfaces 49 of the tubular bodies interengage firmly in the plane 62 and determine that plane, and the center contact buttons 58 are biased forwardly into interengagement in that same plane, yielding to the extent necessary to assure the desired engagement between the surfaces 49.

FIG. 4 shows the line when connected in the manner described above, i.e., with the left coupling ring run up and connected to the other unit. In accordance with the universality of the device, the other coupling ring 26R can be connected to the left unit, as shown in FIG. 5.

When the parts of each connector unit are in retracted position as in FIG. 1, the exposed ends 49 of the line sections are forwardmost, or at least as far forward as any surface, and the sections to be connected may be moved into position from any direction, whether sidewise, longitudinally, or in any other direction. It is not necessary to preliminarily pre-position the sections in any special manner such as by telescoping them, angularly positioning them, or placing them in any certain position for the purpose of turning up the coupling rings, other than to merely bring the ends of the line sections together. Normally the parts are in retracted position, preparatory to connecting, and hence it is not necessary for the service man in the field to first move any of the parts to any certain position before aligning the line sections, — he merely aligns them and turns up one of the coupling rings.

We claim:

1. A connector assembly for use in connecting a pair of line sections, including identical connector units on the sections, each unit including a threaded inner coupling sleeve surrounding the line section in spaced relation thereto and fixed axially thereon, and a threaded outer coupling ring on the inner coupling sleeve movable axially on the line section forwardly from a retracted position to an advanced position wherein it projects forwardly beyond the end of the inner coupling sleeve, a centering sleeve between the line section and the inner threaded coupling sleeve and closely fitting the line section, the outer coupling ring being threadable onto the inner coupling sleeve on the other line section, and when so threaded being operative for moving the centering sleeve into telescoping relation over adjacent portions of both line sections, whereby the outer coupling ring and the inner coupling sleeve on which it is threaded, and the centering sleeve in telescoping relation as stated, form a continuous composite component engaging both sections of the line and form an effective continuous rigid line of the sections.

2. A connector assembly according to claim 1 wherein the outer threaded member is threaded on the inner member of its own unit, and positionable axially rearwardly from the forward end thereof, whereby to enable threading of the outer member of either unit onto that inner threaded member of the other unit.

3. A connector assembly according to claim 1 wherein each inner threaded member is secured on its line section and has an axially forward terminal portion forming an effective forward end of the line section, the two line sections being arranged for alignment and end-to-end abutment of the inner threaded members, the outer threaded members being individually movable each beyond its own inner threaded member and into telescoping relation to the other, whereby to encompass the two inner threaded members to form a continuous effectively single line.

4. A connector assembly according to claim 1 wherein each unit includes a tubular body secured to the line section and having a plurality of circumferentially discontinuous radially outwardly extending projections, and the inner threaded member is secured to said projections.

5. A connector assembly according to claim 4 wherein the tubular body and inner threaded member together form a sub-unit fixed axially on the line section, and the centering sleeve is fixed to the outer coupling ring for movement axially therewith and movable into telescoping relation with the other line section when the connector units are connected.

6. A connector assembly according to claim 5 wherein the centering sleeve is provided with a plurality of circumferentially spaced slots receiving the projections on the tubular body.

7. A connector assembly according to claim 1 wherein each unit includes a tubular body secured to the line section and the coupling sleeve is connected to the tubular body, the coupling ring is mounted on the coupling sleeve and movable from its own coupling sleeve to the coupling sleeve in the other unit.

8. A connector assembly according to claim 1 and including means operative for normally retaining each outer coupling ring against rotation, and each means being manually actuatable for releasing the corresponding outer coupling ring, the outer coupling rings being fully rotatable when so released.

9. A connector assembly according to claim 8 wherein the retaining means includes an axially movable and non-rotatable reaction ring, means biasing the reaction ring forwardly into non-rotating engagement with the outer coupling ring when the latter is in retracted position.

10. A connector assembly for use in connecting a pair of line sections including identical connector units on the sections, each unit including a tubular body mounted on the end of the line section and having an axially forward end surface, the tubular body having a pair of circumferentially discontinuous projections extending outwardly and having external threads, a coupling sleeve telescoped over the tubular body and having inturned elements non-rotatingly engaging said projections and having external threads adjacent its forward end, and its forward end terminating no farther than the forward end of the tubular body, the tubular body and coupling sleeve thus forming a sub-unit fixed axially of the line section, an outer coupling ring mounted on the tubular body and movable axially thereof and thus axially of the line section and having at its forward end internal threads engaging the external threads at the forward end of the coupling sleeve, and having a retracted position removed from the forward end of the tubular body and also from the forward end of the external threads on the coupling sleeve, the outer coupling ring by threading on its related coupling sleeve being projectible beyond that coupling sleeve and thus beyond the end of the tubular body and thereby beyond the end of the line section, and by further movement threadable onto the external threads on the coupling sleeve in the other unit, whereby to secure the line sections together.

11. A connector assembly according to claim 10 and including a centering sleeve, wherein the tubular body and centering sleeve have interengaging conformations preventing relative rotational movement but enabling relative axial movement, and the centering sleeve is connected with the coupling ring and movable axially therewith.

12. A connector assembly according to claim 10 wherein the tubular body defines an axially forward end surface forming the effective end surface of the line section, and including a centering sleeve slidably mounted on the tubular body, the tubular body and centering sleeve having circumferentially discontinuous, interfitting projections and slots operatively preventing relative rotation but enabling axial relative movement therebetween, an outer coupling ring connected with the centering sleeve and movable axially therewith but movable rotationally relative thereto, and means on each line section including means fixed axially of the line section for operative cooperation by the coupling ring of the other unit for threading thereonto and correspondingly moving the centering sleeve telescopically over the other line section.

13. A connector assembly according to claim 12 wherein the line sections are of co-axial cable having an outer conductor on which the tubular body is mounted, and an inner conductor, and wherein each unit includes an annular insulator interposed axially between the tubular body and the line proper mechanically radially positioning the inner conductor relative to the outer conductor.

14. A connector assembly for use in connecting a pair of line sections, including identical connector units one on each of the sections, each unit including an inner tubular body telescoped over the end of the line section and having an inner annular shoulder engaging the end of the line section, and forming with the line section an effectively integral extension thereof, the tubular body having intermediate its ends a plurality of circumferentially spaced and discontinuous radially outwardly extending projections, a centering sleeve telescoped on the tubular body and having slots receiving said projections, a coupling sleeve telescoped over the centering sleeve and having connection with the projections on the tubular body preventing both rotational and axial movement, and together therewith forming a sub-unit fixed on the line section relative to axial movement thereof, the coupling sleeve also having external threads adjacent its forward end, the coupling sleeve in its fixed position having a forward end no farther forward than the exposed outer end of the corresponding tubular body, an outer coupling ring telescoped over the foregoing elements and having at its rearward end an internal flange engaging the centering sleeve, a retainer ring rearwardly of the internal flange and fitted in the centering sleeve to limit rearward movement of the coupling ring relative to the tubular body, the coupling ring having internal threads at its forward end engageable with the external threads on the forward end of the coupling sleeve, the parts being so dimensioned and proportioned that the coupling ring can be backed off the external threads on the forward end of the coupling sleeve, the coupling ring being threadable on the threads on the coupling sleeve throughout the threads on the latter and therebeyond and onto the threads of the coupling sleeve in the other unit, whereby to secure the two line sections together, and the outer coupling ring when being so threaded, carrying the centering sleeve forwardly beyond the axially outer end of the body and into telescoping relation with the tubular body in the other unit.

15. A connector assembly according to claim 14 wherein the radial projections on the tubular body together are no greater in circumference than onehalf of the circumference of the tubular body.

16. A connector assembly according to claim 15 wherein the tubular body has an internal rearwardly facing shoulder of annular configuration continuously engaging the forward end of the line section.

17. A connector assembly according to claim 16 wherein an annular insulator member is interposed between the internal shoulder on the tubular body and the forward end of the line section.

18. A connector assembly according to claim 17 wherein the line is a co-axial electrical cable, including an outer conductor and a center conductor, and wherein the annular insulator member is radially centered between the inner and outer conductors.

19. A connector assembly for use in connecting sections of a cable having forward end surfaces and having outer and center conductors, means mechanically and rigidly interengagingly connecting the outer conductors, the center conductors having axial, end-opening apertures, center contacts in the apertures and having forward end surfaces, and having abrupt rearward shoulders engaging the forward surfaces of the center conductors, and the center contacts having yieldable elements acting against the surfaces of the apertures therewithin operative for biasing the center contacts forwardly toward the position in which their forward end surfaces project forwardly beyond the forward end surfaces of the center conductors.

20. A connector assembly construction according to claim 19 wherein each aperture has a conical inner end surface, each center contact includes a button of tubular shape having a longitudinal split and axially inwardly extending fingers, the center conductor and center contact having interengaging conformations extending circumferentially and enabling relative axial movement into axially interlocking relation, and the dimensions of the aperture and fingers being such that the fingers interengage the conical surface and that interengagement biases the contact axially forwardly into engagement with the opposed contact.

* * * * *